April 14, 1925.
W. H. CLARKE-JAMES
1,533,724
FITTING FOR CONNECTING TOGETHER PARTS OF WOODEN STRUCTURES AND THE LIKE
Filed Oct. 16, 1922
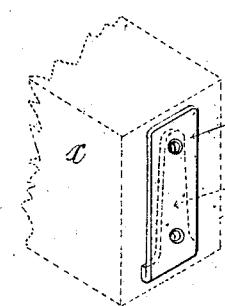
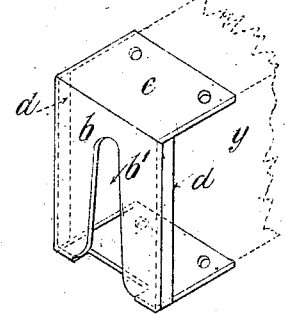
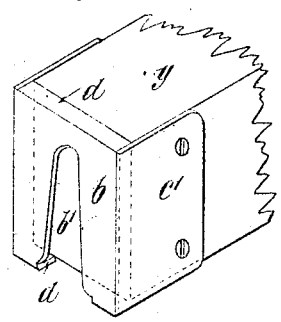
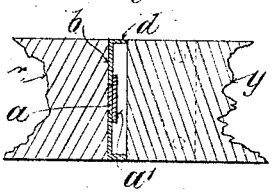
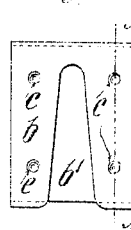
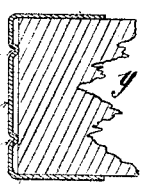
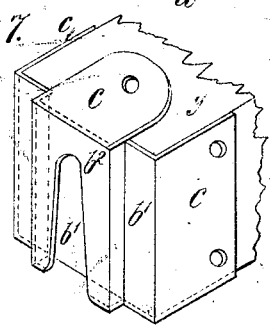
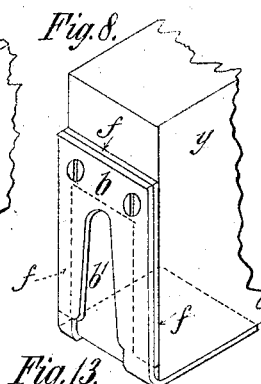
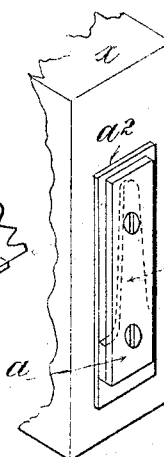
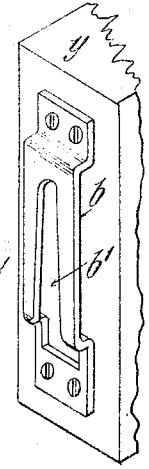
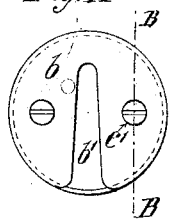
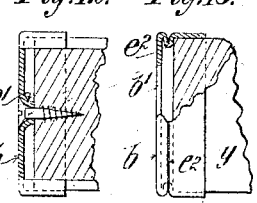
INVENTOR.
William Henry Clarke-James.
his Attorney.

Patented Apr. 14, 1925.

1,533,724

UNITED STATES PATENT OFFICE.

WILLIAM HENRY CLARKE-JAMES, OF LONDON, ENGLAND.

FITTING FOR CONNECTING TOGETHER PARTS OF WOODEN STRUCTURES AND THE LIKE.

Application filed October 16, 1922. Serial No. 595,012.

*To all whom it may concern:*

Be it known that I, WILLIAM HENRY CLARKE-JAMES, a subject of the King of Great Britain, residing at 32 Alfred Place, Tottenham Court Road, London, England, have invented an Improved Fitting for Connecting Together Parts of Wooden Structures and the like, of which the following is a specification.

This invention relates to an improved fitting for connecting together parts of wooden structures and the like of that type in which is employed a bracket adapted to be secured on one of the parts to be connected together and a clip adapted to be secured on the other part. The bracket is provided with a tapering tongue adapted to fit into a tapered slot in the clip. Now in such fittings the clip has to be so positioned on the part carrying it that a pre-determined space must be left between the end of the part to which it is attached and the inner face of the tapered slot plate to allow of the front plate of the bracket passing between the surfaces.

In some cases the end of the part carrying the clip has been recessed or cut away, which entails a certain amount of skilled work or when the part is not so cut, to properly position the clip also entails skilled labour and the object of the present improvement is to overcome these drawbacks, so that such fittings may be easily and readily fitted without cutting the parts to be connected together or employing skilled labour.

The present invention comprises essentially a clip fitting, of the kind above specified, provided with projecting distance pieces or their equivalents, preferably formed in the fitting itself, so as to contact with the end on surface of the member to which the fitting is secured and thus allow a pre-determined space to exist between the inner face of the clip plate and the member to allow for the passage of the front plate of the bracket fitting carried on the other member. In most cases the usual back plate of the bracket fitting is dispensed with.

The distance pieces on the face of the clip fitting may be formed by flanging, offsetting, stamping out bosses or protuberances or attaching one or more pieces of the desired thickness.

This invention will now be more particularly described making reference to the accompanying drawing in which:—

Fig. 1 is a perspective view of the bracket fitting.

Fig. 2 is a similar view of the clip fitting.

Fig. 3 is a sectional view in plan showing two members joined together by the fittings.

Fig. 4 is a perspective view of a modified clip fitting.

Fig. 5 is a view in end elevation of a modified clip fitting.

Fig. 6 is a view in section on line A—A of Fig. 5.

Figs. 7 and 8 are perspective views of further modifications of the clip fitting.

Fig. 9 is a perspective view of a modification of the bracket fitting.

Fig. 10 is a similar view of the clip fitting therefor.

Fig. 11 is a view in end elevation of a clip fitting for use with cylindrical rods.

Fig. 12 is a view in section on line B—B of Fig. 11, and

Fig. 13 is a side view partly in section of a modified form of clip fitting for use with cylindrical rods.

Referring more particularly to Figs. 1, 2 and 3, the bracket fitting comprises a front plate $a$ having a smaller wedge shape tongue $a^1$ on its back surface and is conveniently formed by stamping out sheet metal doubled on itself as shown. This fitting is attached by nails or screws to the end of the member $x$. The clip fitting, which is also preferably formed by stamping and pressing from sheet metal, comprises a plate $b$ having a tapered slot or notch $b^1$ formed therein approximating to the shape of the tongue $a^1$ and is formed with right angled top and bottom flanges $c$ adapted to embrace and carry the end of the other member $y$ with narrow lateral right angled side flanges $d$ adapted to act as distance pieces for positioning the end of the rail. In the modification shown on Fig. 4, the clip fitting is formed with right angled lateral flanges $c^1$ for attachment to the member $y$ and the end thereof is properly positioned by short right angled top and bottom flanges $d$. The bottom flange in Figs. 1–4 is cut away to allow for the passage of the plate $a$ of the bracket fitting.

In substitution of flanges acting as distance pieces as herein described, the inner face of the plate $b$ may be provided with bosses $e$, see Figs. 5 and 6, stamped in the metal or by an auxiliary piece $f$, see Fig. 8, made in one with and attached to the inner face of the plate $b$.

In a further modication, see Fig. 7, the clip fitting is formed with flanges $c$ to embrace the end of the member $y$ and the face of the plate $b$ is offset as shown to form a projecting box $b^2$ in which is formed the tapered slot or notch $b^1$ for engagement with the tongue $a^1$ of the bracket fitting. In the modification shown on Figs. 9 and 10, the bracket fitting is provided with a back plate $a^2$ and the clip fitting is formed from a strip of metal having its middle portion containing the slot or notch $b^1$ projecting away from the face of the member $y$ by offsetting its ends by which it is fixed thereto or one or both of said ends beyond the offsets may be bent at right angles to embrace the member $y$.

When the member $y$ is of a circular form in cross section, the clip fitting, see Figs. 11 and 12, is formed as a correspondingly shaped socket or cap, the end plate $b$ of which is formed with the slot or notch $b^1$ and stops, or "bursts" $e^1$ are formed in the face of the end plate $b$. These "bursts" may conveniently provide holes for attaching screws, as shown. In some cases inturned flanges or bosses may be formed in the side wall of the socket or cap so as to prevent the member $y$ from contacting directly with the inner face of the end plate and thus act as distance pieces for properly positioning the end of the rail or rod. In Fig. 13 is shown one such arrangement in which a circular flange or fold $e^2$ is employed.

I declare that what I claim and desire to secure by Letters Patent is:—

A fitting for connecting together parts of wooden structures comprising a bracket secured to one part to be connected and a clip adapted to be secured to the other part, the bracket comprising vertical spaced members, the front one being a rectangular plate and having attached to its back surface a smaller member of a wedge shaped tongue formation which flares downwardly and outwardly from its top end and the clip consisting of a front plate having formed therein a flared slot corresponding to the shape and disposition of the flaring tongue and provided with means for keeping the said tapered slot portion spaced from the surface to which the clip is secured, as set forth.

WILLIAM HENRY CLARKE-JAMES.